United States Patent [19]

Vlaanderen

[11] Patent Number: 5,427,495
[45] Date of Patent: Jun. 27, 1995

[54] DEVICE FOR LIFTING A CONTAINER

[75] Inventor: James Vlaanderen, Garner, Iowa

[73] Assignee: Stellar Industries, Inc., Garner, Iowa

[21] Appl. No.: 65,580

[22] Filed: May 21, 1993

Related U.S. Application Data

[63] Continuation-in-part of Ser. No. 728,967, Jul. 12, 1991, abandoned.

[51] Int. Cl.$^6$ .............................................. B60P 3/00
[52] U.S. Cl. .................................... 414/498; 414/546; 414/667
[58] Field of Search ............... 414/408, 409, 491, 498, 414/500, 545, 667, 671, 546; 280/28.17; 410/35; 220/1.5

[56] References Cited

U.S. PATENT DOCUMENTS

| | | | |
|---|---|---|---|
| 1,567,478 | 12/1925 | Vonnez et al. | 414/500 |
| 3,289,873 | 12/1966 | Hansen | 414/671 |
| 3,471,048 | 10/1969 | Terho | 414/491 X |
| 3,734,327 | 5/1973 | Ellis, Jr. | 414/667 |
| 3,987,918 | 10/1976 | Corompt | 414/498 X |
| 4,278,390 | 7/1981 | Ahearn | 414/555 X |
| 4,589,671 | 5/1986 | Boughton | 414/546 X |
| 4,627,782 | 12/1986 | Larson | 414/491 |
| 4,915,567 | 4/1990 | Ellingsen | 414/498 X |
| 4,930,799 | 6/1990 | Pilhstrom et al. | 414/500 X |
| 4,986,716 | 1/1991 | Winter | 414/498 X |
| 5,161,931 | 11/1992 | Mayer | 414/667 X |

FOREIGN PATENT DOCUMENTS

| | | | |
|---|---|---|---|
| 2620664 | 3/1989 | France | 414/498 |
| 3927646 | 3/1991 | Germany | 414/546 |
| 0051122 | 4/1979 | Japan | 414/546 |
| 0170640 | 10/1983 | Japan | 414/498 |
| 2188029 | 9/1987 | United Kingdom | 414/546 |

OTHER PUBLICATIONS

Vulcan Equipment Company, 618MLS, Cat. No. 9120565, Apr. 1990.
Stellar Industries, Stellar Shuttle Model 56-9-3 Apr. 1991.
Multi Lift, Hiab Cranes & Loaders Inc. Apr. 1991.

*Primary Examiner*—Michael S. Huppert
*Assistant Examiner*—James Eller
*Attorney, Agent, or Firm*—Wood, Phillips, VanSanten, Clark & Mortimer

[57] ABSTRACT

A container carriage has an elongated skid 30 with an upstanding arm 76 at a forward end thereof, the arm 76 being releasably engageable with a loader 32 mounted on the frame of a container hauling truck 36. A pair of laterally spaced legs 80,82 formed on the skid adjustably mount a pair of arm attachments 102 to engage and carry a conventional front loading container 52. Alternatively, hook attachments 118 are adjustably mounted on the legs 80,82 to engage and carry a conventional rear loading container 62. Movement of the loader 32 between an on-off loading position and a transport position results in the carriage being drawn across the end of the truck 36 and positioned in overlying relation with the truck frame 34.

14 Claims, 4 Drawing Sheets

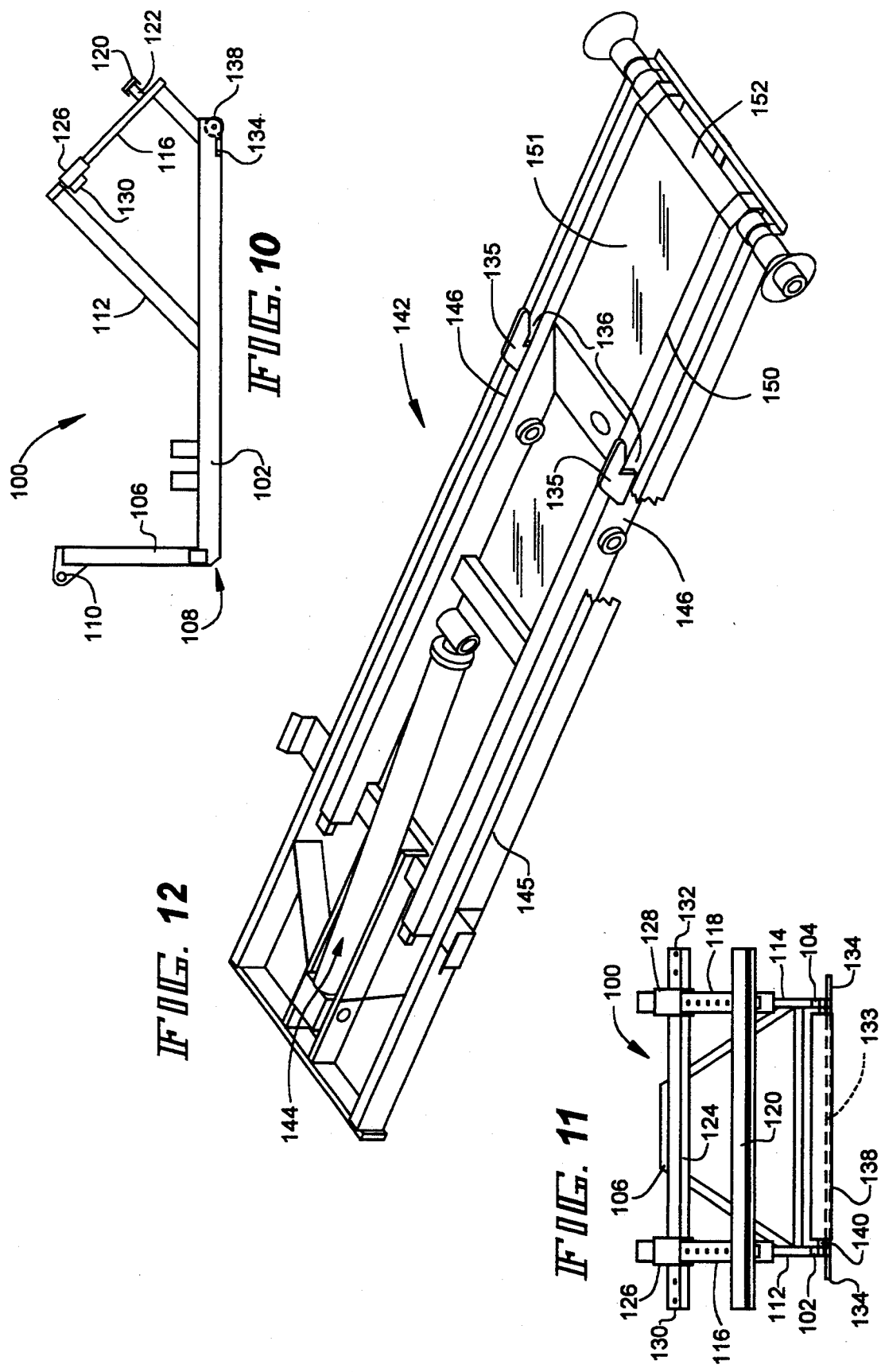

DEVICE FOR LIFTING A CONTAINER

This application is a continuation-in-part of U.S. Ser. No. 728,967, filed Jul. 12, 1991, now abandoned.

BACKGROUND OF THE INVENTION

1. Technical Field

The present invention is directed toward a tool for handling a load-receiving container, and more particularly toward a carriage designed for use with a container hoist mounted on the frame of a container hauling truck.

2. Background Art

Containers for collecting refuse and other articles are commonly located in areas intended to provide convenient access to the containers, such that individuals who deposit items in the containers are not deterred from making use of them. Once a container becomes full, the container is transported to a central emptying site and an empty container is returned to the original location. One method of transporting a container is to hoist the container with a truck-mounted hydraulic loader and deliver the container to the emptying site. In order to hoist a container with a hydraulic loader, a carriage is coupled with the loader and then maneuvered into engagement with a container.

Typically, a carriage first is moved to the rearmost end of a truck bed. The hydraulic loader, which is commonly an articulated hoist, then is moved into engagement with a portion of the carriage. The truck is maneuvered to engage the carriage with the container, and the hydraulic loader is actuated to elevate the carriage and the container for subsequent transportation. The laborious process of connecting the carriage to the truck is time consuming and requires extensive manual effort.

In addition to the complexity of attaching the container, a significant problem exists with the use of present carriage arrangements. Due to the geometric relationship between truck-mounted hydraulic loaders and the direct connection between the carriage and the truck, it is impossible to draw the carriage and the container fully over the truck frame. Rather, the carriage only can be supported rearward of the truck frame with the hydraulic loader in an extended position. Transportation of the trailing carriage and container causes excessive stresses in the hydraulic loader and the truck frame and reduces the stability of a container supported by the carriage. This condition is intensified when a loaded container is supported on the carriage.

Because of the significant forces which act on the container-carrying truck when a container is supported in an extended loader position, it has heretofore been necessary to handle containers with massive, costly trucks, such as garbage packing trucks, which are better suited to accommodate the high forces. There is a need, therefore, for a container carriage which can be transported without generating undesirable forces levels in the transporting vehicle, such that less expensive, general purpose vehicles may be employed to safely handle the containers.

SUMMARY OF THE INVENTION

It is an object of the present invention to provide a new and improved container carriage designed to facilitate the handling of container by a loader mounted on the frame of a container hauling truck and moveable between an extended on-off loading position and a retracted transport position.

The carriage according to the present invention has an elongated skid having a pair of parallel main rails with an upstanding arm formed at a forward end thereof, the arm being releasably engageable with the loader. Displacement of the loader from the on-off loading position to the transport position results in the main rails of the skid being drawn across the end of the truck and positioned in overlying relation with the truck frame.

A pair of laterally spaced legs are associated one each with the main rails are adapted to carry alternative types of containers when the loader is moved between the on-off loading position and the transport position. Alternative container attachments are movably mounted on a cross bar which extends transversely between the legs, with the cross bar being adjustable along the legs to accommodate the manipulation of different sized containers.

A pair of arm attachments are adjustably mounted on the cross bar to engage and carry a conventional front loading container. Alternatively, hook attachments are mounted on the cross bar to engage and carry a conventional rear loading container. Both the arm attachments and the hook attachments are laterally movable along the cross bar to closely flank the opposite sides of a container to be grasped.

In an alternative embodiment the carriage is usable with a hoist having at least one rearwardly opening hook. The carriage has a laterally extending foot receivable in the hook when the hoist is moved into the retracted transport position to secure the carriage on the truck frame. Preferably, a roller extends substantially the full width of the carriage between the longitudinal rails and is engageable with the hoist for facilitating movement of a container into overlying relation with the truck frame.

BRIEF DESCRIPTION OF THE DRAWINGS

FIG. 10 is a side elevation of an alternative embodiment of the container carriage;

FIG. 11 is an end elevation of the container carriage shown in FIG. 10; and

FIG. 12 is a perspective view of a truck frame of the type used with the container carriage shown in FIG. 10.

DESCRIPTION OF THE PRIOR ART

Figure 1:
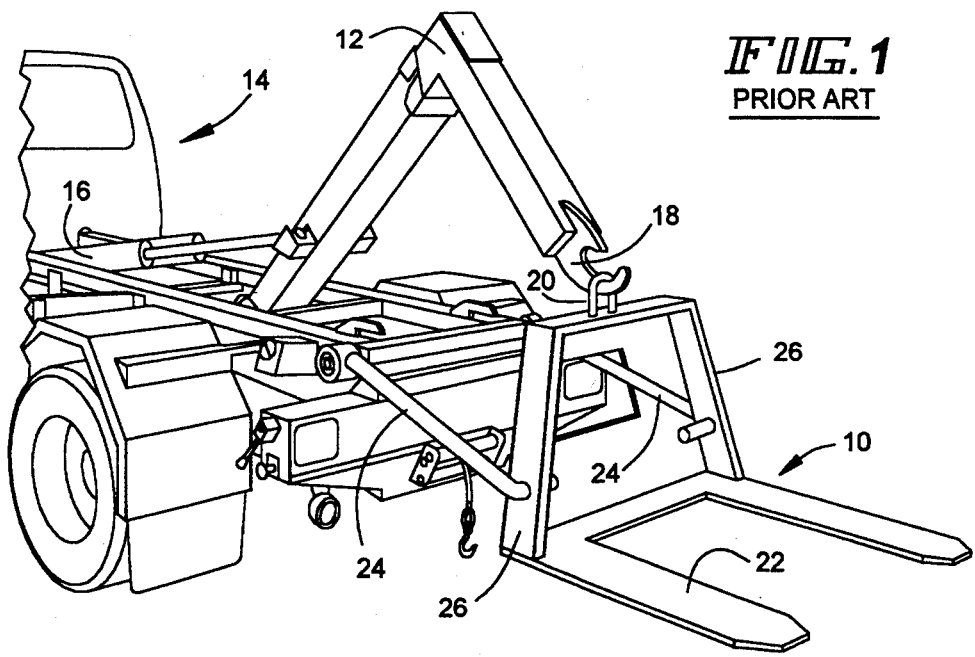
FIG. 1 is partial perspective view illustrating a prior art container lifting apparatus.

An example of a prior container lifting and transporting platform having the above described shortcomings is shown in FIG. 1, generally at 10, in conjunction with a carrier 12 which is pivoted to the frame of a truck 14 and powered for rotary movement by means of a telescoping power cylinder 16 pivoted to the truck frame. A hook 18 provided at one the carrier 12 engages an eye 20 to support the platform 10 and a container (not shown) which can be supported on load-engaging tongues 22. A pair of rearwardly extending braces 24 connect the truck frame and upstanding legs 26 to stabilize the platform 10 and the carrier 12.

As may be understood from the following, the container lifting and transporting platform 10 can only be used to transport a container when the hoist 12 is an extended position. To attach the platform 10 to the hoist with the load-engaging tongues 22 resting on the ground, the braces 24 are connected between the upstanding legs 26 and the truck frame. The power cylinder 16 then is extended to rotate the hoist and engage the hook 18 with the eye 20. To carry a container, the truck is backed toward a container until the load-engaging tongues 22 extend along an underside of the container. The hoist 12 then is oppositely rotated to elevate the platform 10 and the container for subsequent transport.

Due to the geometric relationship between the trajectory of the hook 18 and the cross braces 24, it is impossible to fully retract the cylinder 16 and support the hoist 12 and the platform 10, either loaded or unloaded, over the truck frame. Instead, the pivotally interconnected truck frame, hoist 12, and cross braces 24 constrain the motion of the platform 10 and require the platform 10 to be supported rearwardly of the truck frame with the cylinder 16 in a partially extended position. Transportation of the rearwardly supported platform 10 induces significant stresses in the hoist 12, the cylinder 16, and the truck frame, and impedes the safety with which a container may be transported because of the instability imparted to the vehicle by the placing of the load to the rear of the vehicle.

DESCRIPTION OF THE PREFERRED EMBODIMENT

Figure 2:
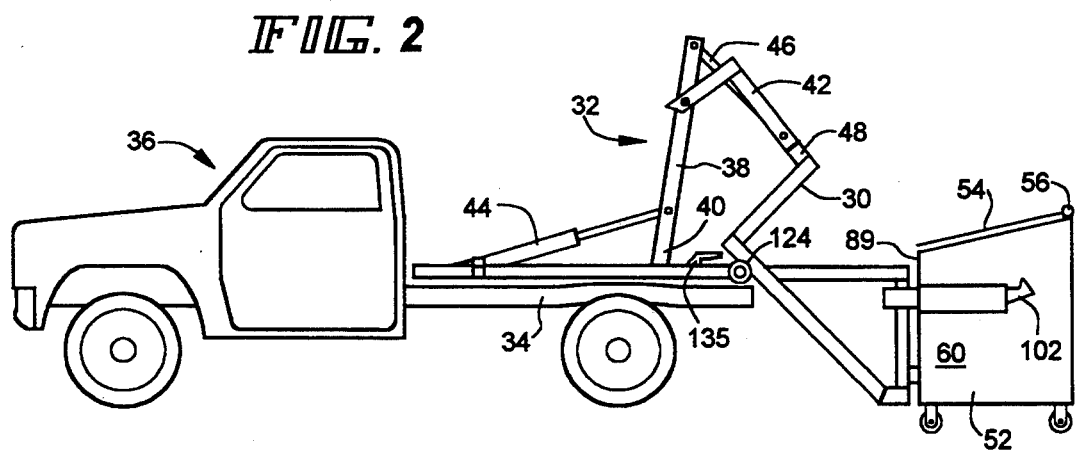
FIG. 2 is a side elevation of a container carriage according to the present invention supporting a conventional front loading container in an on-off loading position.

A container carriage adapted to overcome the above noted deficiencies is shown in FIG. 2 and comprises an elongated skid 30 releasably engaged with a hydraulic loader 32. The loader 32 is pivoted to the bed or frame 34 of a truck 36 and may be of any of several known constructions.

In the form illustrated, the loader 32 includes a main link 38 pivoted at one end 40 to a rearward portion of the truck, with an L-shaped tilt link 42 pivoted to the main link 38 along the length thereof. The main link 38 is powered for rotation relative to the truck by a telescoping power cylinder 44 pivotally interconnected to both the main link 38 and the truck frame 34, and the tilt link 42 is powered for rotation relative to the main link 38 by a power cylinder 46 pivotally interconnected to both the tilt link 42 and the main link 38. A hook 48 is provided at one end of the tilt link 42 to releasably couple the container skid 30 with the loader 32.

Figure 3:
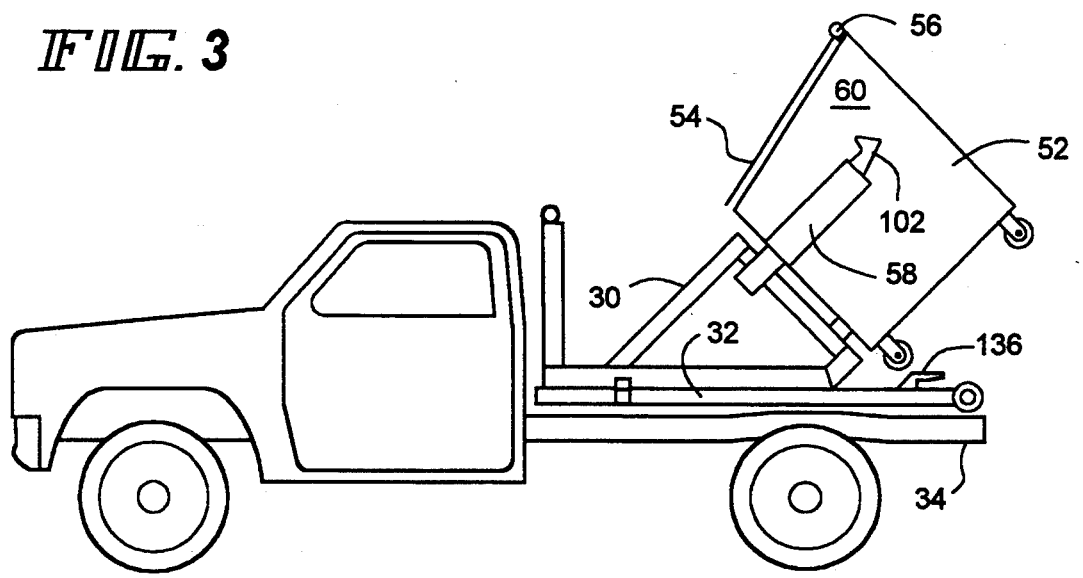
FIG. 3 is a side elevation similar to FIG. 2 but showing the container carriage supporting a front loading container in a transport position.
Figure 4:
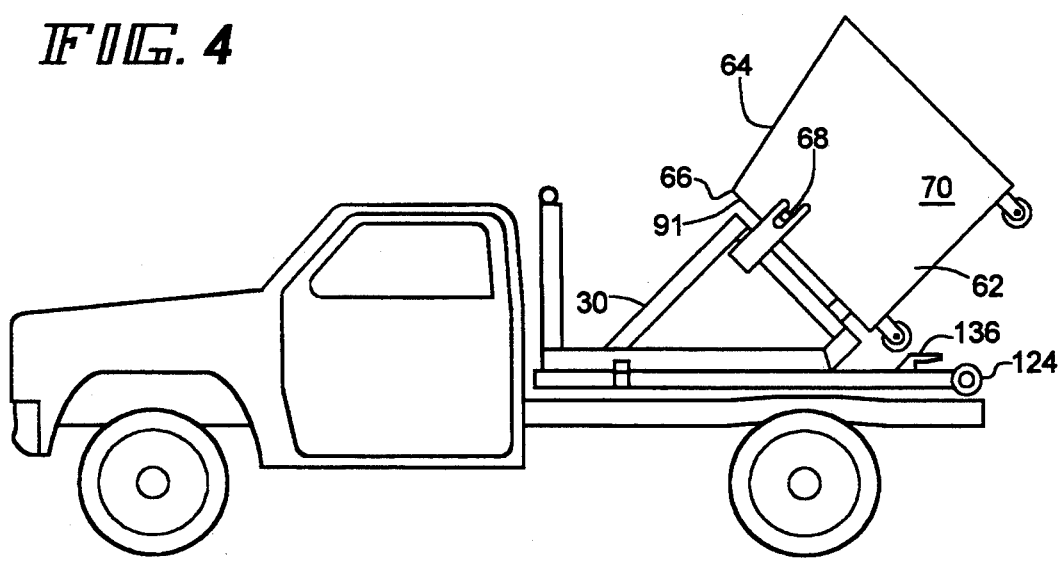
FIG. 4 is a side elevation similar to FIG. 3 but showing the container carriage supporting a convention real loading container in the transport position.

Conventional operation of power cylinders 44 and 46 is employed to move the loader 32 between an extended, on-off loading position as shown in FIG. 2, and a retracted, transport position as shown in FIGS. 3 and 4.

The container skid 30 is suitable for carrying containers having a generally parallelepiped construction with various means of accessing the container interior. Depending on the method of accessing the interior, different container handling means are commonly provided integrally with the container exterior to facilitate manipulation of the container for transportation and emptying.

In FIGS. 2 and 3, a front loading container 52 has a hinged cover 54 pivoted to the container about a rear container edge 56 by conventional means not shown. A pair of laterally extending channels 58 (one shown in FIGS. 2 and 3) are formed on opposite side faces 60 of the container. In FIG. 4, a rear loading container 62 has a hinged cover 64 pivoted to the container about a front edge 66. A laterally extending grab bar 68 projects outwardly from opposite side faces 70 of the container generally along the front edge 66. As will be described, container carriage 30 is capable of carrying either the front loading container 52 or the rear loading container 62.

Figure 5:
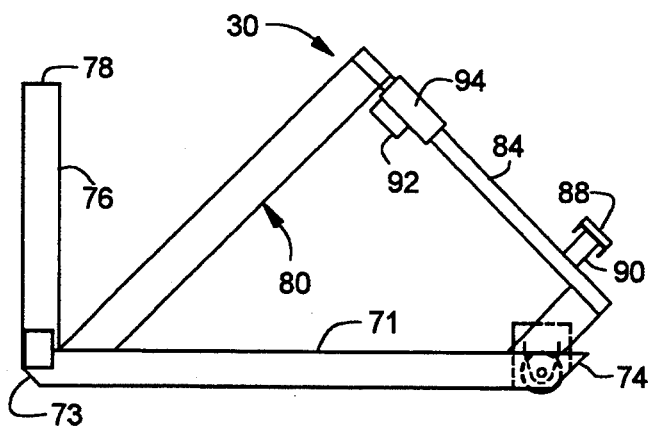
FIG. 5 is a side elevation of the container carriage shown in FIGS. 2-4.
Figure 6:
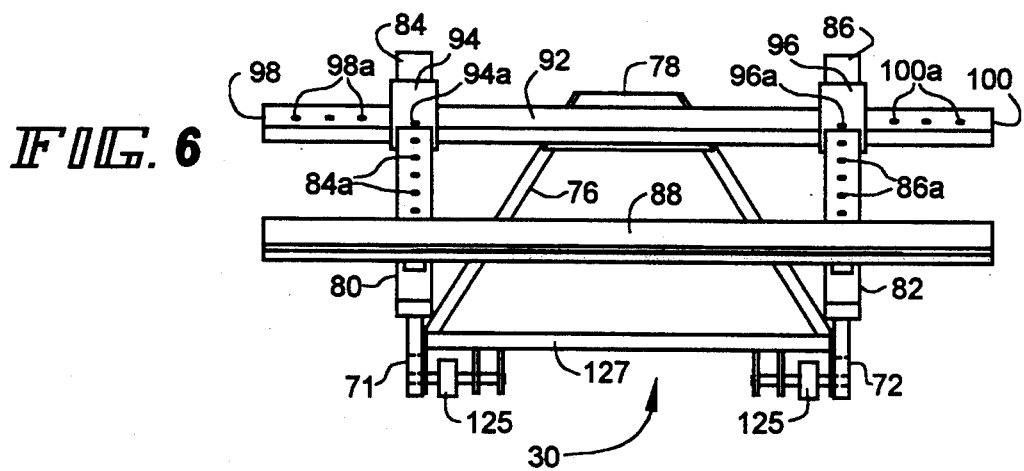
FIG. 6 is an end elevation of the container carriage shown in FIG. 5.

The container skid 30 will now be described. Referring to FIGS. 5 and 6, the container carriage 30 has a base formed by a pair of parallel spaced main rails 71 and 72 extending between opposite ends 73 and 74 of the skid 30. A generally A-shaped arm 76 projects away from the end 73 of the skid 30 and has a remote upper end 78 adapted for releasable engagement with the hook 48 formed on the tilt link 42. A pair of mutually parallel upstanding legs 80 and 82 extend from a respective one of the main rails 71 and 72, with each leg having an inclined rail 84 and 86 respectively associated therewith.

As shown in FIGS. 2 and 3, the inclined rails 84 and 86 are arranged such that they extend at an angle of approximately 45 degrees with respect to the main rails 71 and 72, whereby the rails 84 and 86 are substantially vertical when the loader 32 is in the on-off loading position (FIG. 2) and extend at an angle of approximately 45 degrees with respect to the horizontal when the loader 32 is in the transport position (FIG. 3).

A laterally extending cross bar 88 projects outwardly beyond the legs 80 and 82 in generally perpendicular relation thereto and is mounted to the inclined rails 84 and 86 by means of posts 90 (one shown in FIG. 5), with the length of the posts 90 resulting in a slight offset of the cross bar 88 from the inclined rails 84 and 86.

A second cross bar 92 is mounted on the legs 84 and 86 in parallel spaced relation to the cross bar 88, with the second cross bar 92 having a pair of sleeves 94 and 96 movably mounted on the respective inclined rails 84 and 86 of the legs 80 and 82. The position of the second cross bar 92 along the inclined rails 84 and 86 is maintained by pins inserted through openings 94a and 96a in the sleeves 94 and 96, respectively, which are aligned with one of a series of longitudinally spaced openings 84a and 86a formed in the inclined rails 84 and 86, respectively. This construction permits variable adjustment of the vertical position of the cross bar 92 when the loader 32 is in the on-off loading position (FIG. 2).

Figure 7:
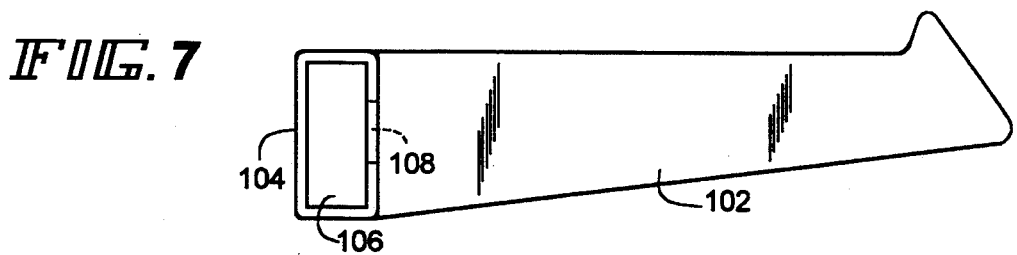
FIG. 7 is a side elevation showing an arm attachment for grasping a conventional front loading container.
Figure 8:
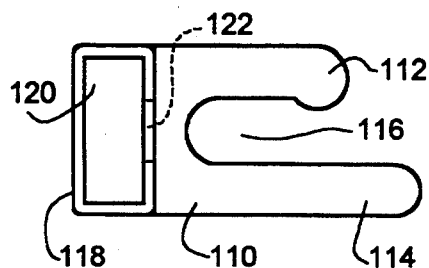
FIG. 8 is a side elevation showing a hook attachment for grasping a conventional rear loading container.
Figure 9:
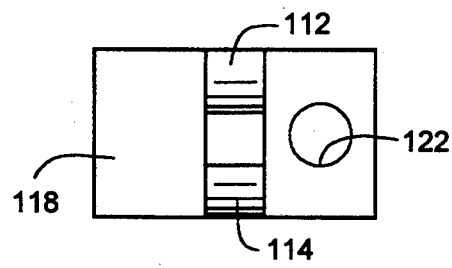
FIG. 9 is an end elevation of the hook attachment shown in FIG. 8.

In order to grasp a container, a pair of suitably adapted attachments are adjustably mounted on the opposite ends 98 and 100 of the adjustable cross bar 92. Referring to FIGS. 7-9, an elongated arm 102 has a transverse sleeve 104 formed at one end thereof with an axial extending passage 106 for receiving either of the cross bar ends 98 and 100. A pair of identical arms 102 are laterally adjustable along the cross bar 92 by means of pins inserted through openings 108 formed in each sleeve 104 and aligned with one of a series of laterally spaced openings 98a and 100a formed in the cross bar ends 98 and 100, respectively.

As an alternative to the arms 102, a hook 110 can be mounted on each end 98 and 100 of the cross bar 92. Each hook 110 has a pair of spaced apart fingers 112 and 114 together defining a U-shaped notch 116, and a transverse sleeve 118 having a passage 120 for receiving either of the cross bar ends 98 and 100. A pair of identical hooks 102 are each laterally adjustably along the cross bar 92 by means of a pin inserted through an opening 122 in each sleeve 118 and aligned with one of the series of laterally spaced openings 98a and 100a formed in the cross bar ends 98 and 100, respectively.

It is believed that operation of the container skid 30 can be understood from the foregoing and may be summarized as follows.

Initially, with the carriage disconnected from the loader 32 and the main rails 71 and 72 of the skid 30 resting on the ground, the skid 30 is loaded onto the truck 36 by first backing the truck toward the skid 30, with the rear end of the truck frame 34 moving toward the skid end 73. When the truck reaches a suitable distance from the static skid, the power cylinders 44 and 46 are extended to rotate main link 38 and tilt link 42, respectively, until the hook 48 engages the end 78 of the frame 76. The power cylinders are then retracted to counter-rotate the links 38 and 42. Counterclockwise rotation of the links 38 and 42, as shown in the FIGURES, raises the skid end 73 and draws the skid 30 across a roller 124 mounted on the end of the truck frame 34. Additional rollers 125 are mounted on the skid 30 along rail 127 extending between the trailing ends of the main rails 71 and 72 to facilitate loading of the skid 30 on the truck frame 34.

To on-load a container 52 or 62, power cylinders 44 and 46 are extended to rotate the links 38 and 42 and move the skid 30 into the position shown generally in FIG. 2, with the main rails 71 and 72 supported on the rollers 124 and 125 and the arms 102, or, alternatively, the U-shaped opening 116 extending in a substantially horizontal direction.

When the front loading container 52 is to be lifted by the skid 30, the truck 36 is backed until the fixed cross bar 88 abuts the forward face 89 of the container 52, with the arms 102 received in the channels 58. Appropriate vertical adjustment of the cross bar 92 and lateral adjustment of the arm attachments 102 is performed as described above to accommodate containers 52 of varying dimension. Retraction of the power cylinders 44 and 46 draws the container skid 30 and the container 52 over the roller 124 and into a transport position on the truck frame 34, with the container 52 being supported along its front face 89 on the cross bar 88.

When the rear loading container 62 is to be loaded onto the truck 36, the truck is backed until the cross bar 88 abuts the front face 91 of the container 62, with the U-shaped openings 116 on the hooks 118 engaging the grab bar 68. Appropriate vertical adjustment of the cross bar 92 and lateral adjustment of the hook attachments 118 is performed as described above to accommodate containers 62 of varying dimension. Retraction of the power cylinders 44 and 46 draws the container skid 30 and the container 62 into the transport position, with the container 62 supported along its front face 91 on the cross bar 88.

An alternative embodiment of a container skid made according to the invention is generally designated 100 in FIGS. 10 and 11 and has a base formed by a pair of parallel spaced main rails 102 and 104. A generally A-shaped arm 106 projects upwardly from the forward end 108 of the skid 100 and mounts a pin 110 adapted for releasable engagement with the hook 48 (Fig. 2) formed on the tilt link 42. A pair of mutually parallel upstanding legs 112 and 114 extend from a respective one of the main rails 102 and 104, with each leg 112,114 having an inclined rail 116 and 118 respectively associated therewith.

A laterally extending cross bar 120 is mounted to the inclined rails 116 and 118 by means of posts 122 (one shown in FIG. 10). A second cross bar 124 is slidably mounted on the legs 112 and 114 by means of sleeves 126 and 128 slidable on respective ones of the inclined rails 116 and 118 of the legs 112 and 114, whereby variable adjustment of the vertical position of the cross bar 120 when the loader 32 is in the on-off loading position is achieved. The sleeves 126 and 128 correspond to the sleeves 94, 96 in the embodiment of FIGS. 2-9. Suitably adapted attachments, such as the elongated arms 102 or the hooks 110 (FIGS. 7-9), are laterally adjustably mountable on the opposite ends 130 and 132 of the adjustable cross bar 124.

A plate 133 is secured to the underside of the rails 102, 104 and has ends terminating in laterally extending feet 134 which project outwardly from each of the main rails 102 and 104. The feet 134 are engageable with the loader 32 for securely locking the skid 100 to the truck frame 34 when the loader 32 is moved into the retracted transport position. More specifically, the loader 32 has a pair of laterally spaced upstanding tie down hooks 135 (FIG. 12) each defining a rearwardly opening slot 136 on the loader 32 for engaging a respective one of the feet 134. As the container skid 100 is drawn onto the loader 32 the feet 134 are pulled into the slots 136 and the skid 100 thereby is prevented from lifting off of the truck bed 34.

A roller 138 is rotatable on an axle 140 extending between the main rails 102 and 104. As shown in FIG. 11, the roller 138 extends across substantially the full width of the container skid 100 and, in the preferred embodiment, the roller 138 is approximately 40″ wide. The roller 138 facilitates loading of the skid 100 onto a truck so that, in particular, the skid 100 can be used with efficacy in connection with a loader of the type generally designated 142 in FIG. 12.

More specifically, the loader 142 can be installed on the bed (frame) 34 of the truck 36 for maneuvering the skid 100 generally as described above relative to the loader 32. For instance, the loader 142 has an arm 144 pivoted to a generally rectangular frame 145 and powered for movement between an extended on-off loading position and a retracted transport position to move the skid 100 into overlying relation with the truck frame 34 for subsequent transport. The frame 145 includes a pair of longitudinal rails 146 each of which has a hook 135. As discussed above, each hook 135 defines a rearwardly opening slot for engaging one of the feet 134 on the skid 100.

A substantially flat plate 150 extends between the rails 146 at the rear end of the frame 145 and defines a smooth horizontal surface 151 on which the roller 138 rolls when the arm 144 retracts and draws the container skid 100 into overlying engagement with the truck bed 34. The plate 150 has a forwardly inclined ramp 152 for facilitating loading of the skid 100 onto the loader 142. Use of the single, substantially full width roller 138 and the flat plate 150 prevents problems which can be encountered when loading a skid by eliminating the requirement of aligning one or more relatively narrow wheels with corresponding surfaces on a loader. Instead, the relatively full width roller 138 reliably engages at least some substantial part of the plate 150 when the arm 144 is retracted. Forward movement of prior container skids on a truck bed is limited by interference between a skid and the loader/dump linkage on the truck bed. Smooth coaction of the present roller 138 with the surface 151 on the top of the plate 150 thus permits the skid 100 to be drawn forwardly on a truck bed further than prior container skids and assures good retention of the skid by locking the feet 134 in the slots 136 of the hooks 135.

The foregoing construction of a container lifting skid provides a novel and versatile tool which may be quickly and simply loaded onto a truck to facilitate the handling of both front loading and rear loading containers. The skid can be drawn advantageously into complete overlying engagement with the truck frame for subsequent transportation, such that forces acting on the truck frame are reduced and general purpose, low cost trucks can be used to handle the skid.

I claim:

1. A carriage for use with a container hoist mounted to the frame of a container hauling truck and movable between an extended on-off loading position and a retracted transport position to move a container into overlying relation with the truck frame for subsequent transport, the carriage comprising an elongated skid having:
    a pair of spaced apart parallel rails extending between opposite ends of the skid;
    an upstanding arm on one end of the skid and adapted for releasable engagement with the hoist where by operation of the hoist the skid is drawn onto the truck;
    a pair of upstanding legs at another end of the skid, each leg extending from a respective one of the parallel rails and including a rail which is inclined with respect to said respective parallel rail;
    a cross bar extending transversely between the upstanding legs;
    a pair of attachments laterally adjustable along the cross bar and adapted for releasable engagement with opposite sides of a container when the hoist is in the on-off loading position so that a container is drawn onto the truck when the hoist is moved to the retracted position; and
    a second cross bar extending transversely between the upstanding legs and fixed to the inclined rails thereof, the second cross bar being engageable with the container to be moved and extending in supporting relation between opposite sides thereof when the hoist is moved between the on-off loading position and the transport position.

2. The carriage according to claim 1 for use with a hoist having at least one rearwardly opening hook, the carriage having a laterally extending foot receivable in said hook when the hoist is moved into the retracted transport position.

3. The carriage according to claim 1 including an elongated roller extending substantially between said rails and engageable with the hoist for facilitating movement of a container into overlying relation with the truck frame.

4. A carriage for use with a container hoist mounted to the frame of a container hauling truck and moveable between an extended on-off loading position and a retracted transport position to move a container into overlying relation with the truck frame for subsequent transport, the carriage comprising an elongated skid having:
    a pair of spaced apart parallel rails extending between opposite ends of the skid;
    an upstanding arm on one end of the skid and adapted for releasable engagement with the hoist whereby operation of the hoist the skid is drawn onto the truck;
    a pair of upstanding legs at another end of the skid, each leg extending from a respective one of the parallel rails;
    a pair of attachments associated one with each of the legs, said attachments being adapted for releasable engagement with a container; and
    guide means embracing said legs and slidable along the length thereof for mounting the attachments for sliding engagement with the legs to facilitate engagement of said attachments with a container when the hoist is in the on-off loading position.

5. The carriage according to claim 4 in which each leg has an inclined rail arranged such that the inclined rail extends substantially vertically when the hoist is in the on-off loading position, the carriage further comprising a cross bar extending transversely between the upstanding legs and movable along the respective inclined rails thereof, said attachments being laterally adjustable along the cross bar and adapted for releasable engagement with opposite sides of a container when the hoist is in the on-off loading position so that a container is drawn onto the truck when the hoist is moved to the retracted position.

6. The carriage according to claim 4 including a cross bar extending transversely between the upstanding legs, said attachments being mounted on the cross bar, and means for slidably mounting the cross bar on the skid for movement relative to the legs so that the position of the attachments on the cross bar can be adjusted to facilitate engagement of said attachment with a container when the hoist is in the on-off loading position.

7. The carriage according to claim 6 wherein said mounting means comprises a first sleeve slidably mounted on one of the legs and a second sleeve slidably mounted on the other of the legs for adjusting the position of the cross bar on the legs, there being mutually aligned openings on the legs and said first and said second sleeve for receiving a fastener to secure the cross bar to the legs.

8. The carriage according to claim 4 including a cross bar supported on the legs and extending transversely therebetween, the cross bar having opposite ends extending laterally outward of said legs, said attachments being laterally adjustable along the cross bar along the cross bar ends outwardly of said rails and adapted for releasable engagement with opposite sides of a container when the hoist is in the on-off loading position so that the container is drawn onto the truck when the hoist is moved to the retracted position.

9. The carriage of claim 8 in which the attachments are slidably engaged with the cross bar.

10. The carriage according to claim 4 for use with a hoist having a substantially flat plate, the carriage including a roller extending substantially between said parallel rails and engageable with the plate for facilitating movement of a container into overlying relation with the truck frame.

11. A carriage for use with a container hoist mounted to the frame of a container hauling truck and movable between an extended on-off loading position and a retracted transport position to move a container into overlying relation with the truck frame for subsequent transport, the carriage comprising an elongated skid having:

- a pair of spaced apart parallel rails extending between opposite ends of the skid;
- an upstanding arm on one end of the skid and adapted for releasable engagement with the hoist so that operation of the hoist may draw the skid onto the truck or unload it therefrom;
- a pair of upstanding legs at another end of the skid, each leg extending from a respective one of the parallel rails and including a rail which is inclined with respect to the respective parallel rail;
- a cross bar extending transversely between the upstanding legs;
- a pair of guides, one fitted on each of said inclined rails, for movement along the associated one of the rails in a generally vertical direction;
- means for locking said guides in any one of a plurality of predetermined positions on the associated rail; and
- a pair of laterally spaced arms or hooks mounted on said guides for movement therewith in said generally vertical direction.

12. The carriage of claim 11 further including an additional cross bar interconnecting said guides, said arms or hooks being mounted on said guides by said additional cross bar, said arms or hooks further being slidably mounted on said additional cross bar for movement towards and away from each other to adjust the lateral spacing therebetween.

13. The carriage of claim 11 wherein said locking means include a plurality of apertures located in each of said inclined rails along the length thereof.

14. A carriage for use with a container hoist mounted to the frame of a container hauling truck and movable between an extended on-off loading position and a retracted transport position to move a container into overlying relation with the truck frame for subsequent transport, the carriage comprising an elongated skid having:

- a pair of spaced apart parallel rails extending between opposite ends of the skid;
- an upstanding arm on one end of the skid and adapted for releasable engagement with the hoist so that operation of the hoist may draw the skid onto the truck or unload it therefrom;
- a pair of upstanding legs at another end of the skid, each leg extending from a respective one of the parallel rails and including a rail which is inclined with respect to said respective parallel rails and a further rail extending from the inclined rail toward the respective parallel rail and toward said skid one end, whereby said arms are generally A-shaped;
- a cross bar extending transversely between the upstanding legs;
- a pair of guides, one fitted on each of said inclined rails, for movement along the rails in a generally vertical direction;
- means for locking said guides in any one of a plurality of predetermined positions on the associated rail, said locking means comprising a series of apertures in each of said inclined rails, at least one aperture in each of said guides, and pins insertable in aligned ones of the apertures in said guides and the apertures in said inclined rails; and
- a pair of laterally spaced arms or hooks mounted on said guides for movement therewith in said generally vertical direction.

* * * * *